Patented Mar. 23, 1948

2,438,176

UNITED STATES PATENT OFFICE 2,438,176

PRODUCTION OF GASPROOF COMPOUND FABRICS

Louis Amédée Lantz and Arthur Schofield, Manchester, England, assignors to The Calico Printers' Association Limited, Manchester, England, a British company No Drawing. Original application July 16, 1943, Serial No. 495,077. Divided and this application July 8, 1944, Serial No. 544,144. In Great Britain May 20, 1942

Section 1, Public Law 690, August 8, 1946
Patent expires May 20, 1962

11 Claims. (Cl. 154—140)

This application is a division of our prior application, Serial Number 495,077, filed July 16, 1943, now abandoned.

The invention relates to the production of fabrics which are impervious to war gases, both in the vapour and liquid form, and particularly to the vesicant type of gas, such as mustard gas.

Our invention comprises a process for producing a gas-proof compound material by combining two or more webs by means of an interlayer or interlayers consisting of a polyvinyl alcohol or water-soluble partial polyvinyl alcohol applied in aqueous solution to one or more of said webs in presence of an acid catalyst and so much of an aldehyde as is sufficient only to insolubilise the amount of polyvinyl alcohol present.

Our invention further comprises the production of a gas-proof compound fabric by coating one side of one of the webs constituting the compound fabric with an aqueous solution of a polyvinyl alcohol or water soluble partial polyvinyl alcohol containing an acid catalyst and so much of an aldehyde as is sufficient only to insolubilise the amount of polyvinyl alcohol present (with which it acts preferentially) so that any cellulosic material present in the fabric is not reacted with the formaldehyde, drying the coated web, applying a further portion of the coating to the coated web, superimposing the webs with the uncoated face of one web against the damp coated face of the other web, joining the webs firmly by pressure, and finally heating the compound fabric to dry it and to form in situ a condensation product of polyvinyl alcohol which is insoluble both in water and organic solvents.

Our invention further comprises coating two webs as aforesaid, drying the coated webs, applying a further coating to one of the webs, superimposing the two webs whilst the further coated web is still wet so that the coated sides of the two webs come together, joining the two webs firmly by pressure, and finally heating the compound fabric to dry it and insolubilise the polyvinyl alcohol.

Our invention further comprises coating two webs as aforesaid, drying the webs, damping the coated side of at least one web, superimposing the two webs so that the coated sides come together, pressing the webs firmly together, and finally heating the compound fabric to dry it and insolubilise the polyvinyl alcohol.

Our invention further comprises coating a web on both sides with a coating as aforesaid, then whilst the coatings are damp or wetted applying uncoated webs to the opposite sides of the coated web, pressing the webs firmly together and finally heating the compound fabric to dry it and insolubilise the polyvinyl alcohol.

The product resulting from the reaction of water-soluble partial polyvinyl alcohols with an aldehyde on the fibre has the advantage of decreased swellability in water compared with the corresponding products obtained from pure or practically pure polyvinyl alcohol. The words "polyvinyl alcohol" as used in this specification are, for the sake of brevity, meant to include such water-soluble partial polyvinyl alcohols. Examples of water soluble partial polyvinyl alcohols are polyvinyl ester-alcohols, polyvinyl acetal-alcohols and polyvinyl ester-acetal-alcohols.

When using formaldehyde we find that a proportion of aldehyde to polyvinyl alcohol up to 40% gives the desired results and whilst a larger proportion may be used, the liability to reaction with cellulosic material increases. The proportion of formaldehyde may, however, be as low as 2.5%, based on the polyvinyl alcohol, under suitable conditions of heating and with an appropriate catalyst.

Instead of formaldehyde, we may use as equivalents its homologues such as acetaldehyde, propaldehyde, butaldehyde, or polymers thereof, such as paraformaldehyde, para-aldehyde, meta-aldehyde; or substitution products, such as chloral, chloral hydrate, and aldol; or unsaturated aliphatic aldehydes such as acrolein, crotonaldehyde and citral; or dialdehydes, such as glyoxal; or aromatic aldehydes, such as benzaldehyde and alkyl-, halogen-, nitro-, hydroxy-, and alkoxy-substituted benzaldehydes; aldehydes in which the functional group is attached to the side chain of an aromatic nucleus, such as cinnamic aldehyde; or heterocyclic aldehydes, such as furfural.

Practically any acid may be used as the catalyst, but acids of medium strength, such as lactic, citric, tartaric, oxalic, formic and chloracetic acids and the aromatic sulphonic acids appear to be the most suitable. Weak volatile acids like acetic acid have little catalytic action, and strong mineral acids, such as hydrochloric and sulphuric acids may only be used with great precautions, for fear of attacking the fibrous material.

Instead of free acids, substances which develop acid on heating may be used, such as ammonium salts or hexamethylene tetramine salts, or salts of other aliphatic or aromatic amines, in which case even the salts of weak volatile acids or the salts of strong mineral acids will give satisfactory results.

Substances which modify the physical properties of the coating may be added thereto such as polyhydric alcohols or their water-soluble derivatives, starches, gums, synthetic resins or their procondensates, proteins, plasticizers, water-repelling agents, mineral fillers, carbon, mineral and organic pigments, soluble colouring matters, and fire-proofing agents.

The rate and degree of insolubilisation of the polyvinyl alcohol on the fibre depends on the following factors: nature and proportion of the aldehyde, nature and proportion of the acid catalyst, time and temperature of heating. These factors are to a large extent interdependent, and equally satisfactory results may be obtained with different sets of conditions; for instance, we may use the same aldehyde and acid catalyst, and either heat for a long time at a comparatively low temperature, or for a short time at a comparatively high temperature; or we may keep the temperature constant and vary the acid catalyst, so as to modify the time of heating. It is therefore possible to adjust the process so as to adapt it to the plant available. Temperatures ranging from about 60° to about 200° C. have been found satisfactory in practice. When using temperatures in the region of 180–200° C., impregnating liquors of an acidity as low as pH 6.0 may be used.

In the coating of webs or fabrics we may use any of the devices commonly used for the purpose, in which the coating paste is either poured on the web or fabric and the excess scraped off by a blade or similar device, or applied to the web or fabric in controlled quantity by means of an engraved roller or the like. The web or fabric may be prepared prior to coating with a sizing agent which controls the penetration of the coating mixture into the web or fabric, such as starches, gums, proteins, resins, both natural and synthetic, and water-repelling agents. These substances may be left in the web or fabric or washed out after insolubilisation of the polyvinyl alcohol coating. The coated material may be dried on heated metal cylinders, either with the coated side upwards or against the metal, or it may be dried in hot air by known methods. More than one coating may be given either on the same side or on both sides of the web or fabric.

The heating which follows the drying of the coated material may be carried out on heated cylinders or in a hot-air machine, either by prolonging the drying operation for the time necessary to complete the reaction between polyvinyl alcohol and aldehyde, or it may be carried out as a separate operation.

After heating, the coated web or fabric may be washed to remove soluble substances. The coating is insoluble both in water and organic solvents.

It is necessary to apply to the web or fabric a sufficiency of coating paste in one or preferably two or more coating operations to form after drying and insolubilising a continuous layer on and/or partly in the material.

Compound materials having a gas-proof interlayer may be produced by coating one or both of the webs which are to be assembled with a solution of a polyvinyl alcohol or water-soluble partial polyvinyl alcohol containing an aldehyde and an acid catalyst, drying the coated web or webs, applying a further coating to one of the webs, superimposing the other web without previous drying and in such a manner that the coated sides of the two webs come together, joining the two webs firmly by pressure, and finally drying and heating the compound material to insolubilise the polyvinyl alcohol.

Two coated and dried webs may also be combined without an additional adhesive coating, by damping the coated sides of the two webs, pressing them together, and drying and heating the compound material.

In another manner of producing a compound material, a web is coated on both sides with the polyvinyl alcohol solution and then combined in the damp state by pressure and heat with an uncoated web on each side.

*Example 1.*—Two webs of heavy cotton canvas are coated each on one side with an aqueous solution containing 20% polyvinyl alcohol, 5% glycerol, 5% aldol, and 2% hexamethylene tetramine lactate. Each fabric is then dried, coated side downwards, on a steam-heated metal cylinder having a polished surface, and subsequently heated for four minutes at 140° C. The result is a flexible, highly glazed coating which is resistant to abrasion and to water. The two coated webs are now damped and superimposed with their coated sides facing each other. The assembled material is then subjected to heat (about 100° C.) and pressure in a blanket calender, resulting in the fusion of the two coating layers and the production of a leather-like, extremely resistant, laminated sheet.

*Example 2.*—An aqueous solution is prepared containing 10% of 40% formaldehyde solution, 5% glycerol, 1% oxalic acid, and 30% of a polyvinyl ester-acetal-alcohol in which 55% of the total hydroxyl groups are free, 30% are substituted by ethylidene radicals, and 15% by acetyl radicals.

Each of two pieces of a linen canvas is coated once with the above solution and dried. One of the pieces is then coated a second time with the same solution, and applied without drying to the coated face of the other piece under pressure, and the assembled material is then dried and heated at 100° C. A material suitable for gas-proof covers is thus obtained.

*Example 3.*—Each of two webs or lengths of a light, closely woven cotton fabric is waterproofed in known manner with an emulsion of paraffin wax. It is then coated twice with an aqueous solution of 25% of the polyvinyl-ester-acetal-alcohol described in Example 2, 7.5% polyglycerol, 3% dimethylol urea, 2% of 40% formaldehyde solution, and 2.5% of hexamethylene tetramine oxalate. It is dried after each coating, and then heated at 150° C. for 2 minutes. The cloth is then passed through a weak solution of ammonia to remove residual acid and formaldehyde. The two coated webs are then damped and pressed together in a blanket calender with their coated sides facing each other. The result is a laminated material which has excellent resistance to mustard gas and does not appreciably swell in water.

What we claim is:

1. A method of producing a composite flexible fabric adapted to resist penetration of liquid and gaseous chemical warfare agents, comprising applying to a plurality of fabric webs an aqueous solution containing a substance selected from the group consisting of polyvinyl alcohol and water-soluble partial polyvinyl alcohols, an acid catalyst, and an aldehyde in a quantity sufficient only to insolubilise the alcohol, combining the webs by means of the interlayers formed from this solution and then heating to form a condensation product in situ which is insoluble both in water and organic solvents.

2. A method of producing a composite flexible fabric adapted to resist penetration by liquid and gaseous chemical warfare agents, from two fabric webs, comprising coating one side of one of the webs with an aqueous solution containing a substance selected from the group consisting of polyvinyl alcohol and water-soluble partial polyvinyl alcohols, an acid catalyst, and an aldehyde in a quantity sufficient only to insolubilise the alcohol without reacting with cellulosic material in the fabric, drying the coated web, applying a second coating to the coated side of the web, superimposing the uncoated web on to the damp coated side of the other web, applying pressure to join the webs firmly together, and heating the composite fabric to dry it and to form in situ a condensation product of polyvinyl alcohol which is insoluble both in water and organic solvents.

3. A method of producing a composite flexible fabric adapted to resist penetration by liquid and gaseous chemical warfare agents, from two fabric webs, comprising coating one side of each of the webs with an aqueous solution containing a substance selected from the group consisting of polyvinyl alcohol and water-soluble partial polyvinyl alcohols, an acid catalyst, and an aldehyde in a quantity sufficient only to insolubilise the alcohol without reacting with cellulosic material in the fabric, drying the coated webs, damping the coated side of at least one web, superimposing the webs with their coated sides in contact, applying pressure to join the webs firmly together, and heating the composite fabric to dry it and to form in situ a condensation product of polyvinyl alcohol which is insoluble both in water and organic solvents.

4. A method of producing a composite flexible fabric adapted to resist penetration by liquid and gaseous chemical warfare agents, from a plurality of fabric webs, comprising coating a web on both sides with an aqueous solution containing a substance selected from the group consisting of polyvinyl alcohols and water-soluble partial polyvinyl alcohols, an acid catalyst and an aldehyde in a quantity sufficient only to insolubilise the alcohol without reacting with cellulosic material in the fabric, applying uncoated webs on both sides of the coated web, pressing the webs firmly together and finally heating the composite fabric to dry it and to form in situ a condensation product of polyvinyl alcohol which is insoluble both in water and organic solvents.

5. A method of producing a composite flexible fabric adapted to resist penetration by liquid and gaseous chemical warfare agents, from two fabric webs, comprising coating one side of each of the webs with an aqueous solution containing a substance selected from the group consisting of polyvinyl alcohol and water-soluble partial polyvinyl alcohols, an acid catalyst, and an aldehyde in a quantity sufficient only to insolubilise the alcohol without reacting with cellulosic material in the fabric, drying one of the coated webs, superimposing the webs with their coated sides in contact whilst one is still damp, applying pressure to join the webs firmly together, and heating the composite fabric to dry it and to form in situ a condensation product of polyvinyl alcohol which is insoluble both in water and organic solvents.

6. A composite flexible fabric adapted to resist penetration by liquid and gaseous chemical warfare agents, especially vesicant liquids such as mustard gas, consisting of a plurality of fabric webs secured together by interlayers of a condensation product, insoluble in both water and organic solvents, of an aldehyde with a substance selected from the group consisting of polyvinyl alcohol and water-soluble partial polyvinyl alcohols in the presence of an acid catalyst, said condensation product being formed and insolubilised in situ on the fabric.

7. The process of claim 1 wherein the aldehyde is employed in proportions ranging from about 2.5 to 40 per cent by weight equivalents of formaldehyde, based on the weight of the polyvinyl alcohol.

8. The process of claim 1 wherein the aldehyde employed is formaldehyde.

9. The process of claim 1 wherein from about 2.5 to 40 per cent of formaldehyde, based on the weight of the polyvinyl alcohol, is employed as the aldehyde.

10. The process of claim 1 wherein the heating step is conducted at temperatures ranging from about 60° to 200° C.

11. The process of producing a composite flexible fabric adapted to resist penetration of liquid and gaseous chemical warfare agents, which comprises superimposing at least two plies of fabric material with a damp layer therebetween comprising an aqueous solution of a water soluble polyvinyl alcohol, an acid catalyst of medium strength and formaldehyde in amount ranging from about 2.5 to 40 per cent of the weight of the polyvinyl alcohol, pressing and heating the resulting assembly to temperatures within the range of about 60° to 200° C. for a time sufficient to form in situ a polyvinyl alcohol condensation product which is flexible but insoluble both in water and organic solvents.

LOUIS AMÉDÉE LANTZ.
ARTHUR SCHOFIELD.

REFERENCES CITED

The following references are of record in the file of this patent:

UNITED STATES PATENTS

| Number | Name | Date |
|---|---|---|
| 1,111,286 | Aylsworth | Sept. 22, 1914 |
| 2,044,730 | Kuehn | June 16, 1936 |
| 2,162,678 | Robertson | June 13, 1939 |
| 2,037,049 | Sager | Apr. 14, 1936 |
| 2,173,781 | Gibello | Sept. 19, 1939 |